United States Patent [19]

Frank

[11] Patent Number: 4,692,504
[45] Date of Patent: Sep. 8, 1987

[54] DEACTIVATION OF PHOSPHONIUM SALT CATALYST

[75] Inventor: Harry Frank, Houston, Tex.

[73] Assignee: Shell Oil Company, Houston, Tex.

[21] Appl. No.: 858,311

[22] Filed: Apr. 30, 1986

[51] Int. Cl.$^4$ ............................................. C08G 59/68
[52] U.S. Cl. ....................................... 528/89; 502/164; 528/365; 528/374; 568/10; 568/11
[58] Field of Search ......................... 528/89, 365, 374; 502/164; 568/10, 11

[56] References Cited

U.S. PATENT DOCUMENTS

| | | | |
|---|---|---|---|
| 3,477,990 | 11/1969 | Dante et al. | 260/47 |
| 3,547,885 | 12/1970 | Dante et al. | 260/47 |
| 3,978,027 | 8/1976 | Marshall | 260/47 EP |
| 4,352,918 | 10/1982 | Doorakian et al. | 528/89 |
| 4,366,295 | 12/1982 | Doorakian et al. | 525/482 |
| 4,370,465 | 1/1983 | Doorakian et al. | 528/104 |
| 4,410,596 | 10/1983 | Doorakian et al. | 428/413 |
| 4,438,254 | 3/1984 | Doorakian et al. | 528/89 |
| 4,496,709 | 1/1985 | Doorakian et al. | 528/89 |

*Primary Examiner*—Earl Nielsen

[57] ABSTRACT

A method is disclosed for deactivating a hydrocarbyl phosphonium salt catalyst of an epoxy resin fusion reaction. The method involves contacting the hydrocarbyl phosphonium salt catalyst with a sulfonic acid, such as p-toluenesulfonic acid or methane sulfonic acid. The method is particularly suited for deactivation of moisture-resistant phosphonium salts such as methylene bis(triphenyl phosphonium halide)s.

17 Claims, No Drawings

DEACTIVATION OF PHOSPHONIUM SALT CATALYST

BACKGROUND OF THE INVENTION

This invention relates to the preparation of epoxy resins. In one aspect, the invention relates to deactivation of a phosphonium salt catalyst. In a further aspect, the invention relates to terminating an epoxy fusion reaction in which a polyepoxide is reacted with a phenol or other acidic compound in the presence of a phosphonium salt catalyst.

It is known to prepare epoxy resins by reacting a compound having a vicinal epoxide group, such as epichlorohydrin, with bisphenol-A in the presence of sodium hydroxide. To prepare linear, high molecular weight epoxy resins, it is common practice to first prepare an epoxy resin having a relatively low weight per epoxide and then react it, in the presence of a catalytic amount of a hydrocarbyl phosphonium halide, with a compound containing phenolic hydroxyl groups. The use of phosphonium halide catalysts for such an epoxy "fusion" or "advancement" reaction results in the formation of linear, high molecular weight epoxy resin.

In order to control the molecular weight of this epoxy resin reaction product, it is necessary that the catalyst be deactivated at the desired phase of the reaction. How readily the fusion catalyst is deactivated depends upon the particular catalyst and the conditions under which the reaction is being carried out. For example, certain phosphonium halide catalysts such as ethyl triphenyl phosphonium iodide are subject to attack by hydroxyl ions. Performing the advancement reaction in a reaction mixture which contains water results in deactivation of the catalyst as the reaction proceeds. This rather slow catalyst deactivation can be used to advantage to control the speed of the advancement reaction, preventing too-rapid reaction as the desired molecular weight is approached.

By contrast, certain hydrocarbyl phosphonium salt advancement catalysts are very stable to hydroxyl ion attack. Such stable catalysts, such as methylene bis(-triphenyl phosphonium bromide), for example, are not deactivated to an appreciable extent by residual water in the reaction mixture. If the reactivity of the catalyst is not controlled, the molecular weight of the fusion product will continue to increase. This can result in difficulty controlling the properties of the fusion resin and changes in properties during storage of the resin.

It would thus be desirable to provide a means whereby hydrocarbyl phosphonium salf fusion catalysts, including those which are highly resistant to hydroxyl ions, can be deactivated in the epoxy fusion reaction medium at the desired point of the fusion process.

SUMMARY OF THE INVENTION

According to the invention, a hydrocarbyl phosphonium salt catalyst is deactivated by contacting the catalyst with a sulfonic acid. The contacting can take place in an epoxy resin fusion reaction mixture in which an epoxide is reacted with an acidic hydroxyl group-containing compound in the presence of a catalytic amount of a hydrocarbyl phosphonium salt, to produce a high molecular weight epoxy resin fusion product. The deactivating agent is preferably a substituted or unsubstituted hydrocarbyl sulfonic acid, such as p-toluenesulfonic acid.

DETAILED DESCRIPTION OF THE INVENTION

The catalyst deactivating agents useful in the invention catalyst deactivation method include compounds which can be described by the formula R—SO$_3$H, in which R is a substituted or unsubstituted hydrocarbyl moiety. R can be aliphatic or aromatic, monomeric or polymeric. R will generally be substituted or unsubstituted $C_1$-$C_8$ aliphatic or $C_6$-$C_{20}$ aromatic. Examples of R—SO$_3$H catalyst deactivation agents include toluenesulfonic acid, methane sulfonic acid, dodecylbenzene sulfonic acid, trifluoromethane sulfonic acid, and benzene sulfonic acid.

The catalyst deactivating agent will generally be added as a solution, preferably an aqueous solution, having a sulfonic acid concentration of from about 2 to about 30 weight percent, preferably about 5 to about 25 weight percent, based on the weight of the liquid medium.

The catalyst deactivating agent is used in any amount effective to reduce the activity of the phosphonium salt catalyst, e.g., to reduce the rate at which the fusion reaction proceeds in the presence of the phosphonium salt catalyst. Generally, the catalyst deactivation agent will be added to the fusion reaction mixture in an amount within the range of about 0.2 to about 3 equivalents deactivating agent per equivalent of phosphonium salt catalyst, preferably about 0.5 to about 2, most preferably about 0.8 to about 1.5.

The fusion catalyst which are deactivated according to the invention include hydrocarbyl phosphonium salts of protic acids, which can be described generally by the formulas I, II and III,

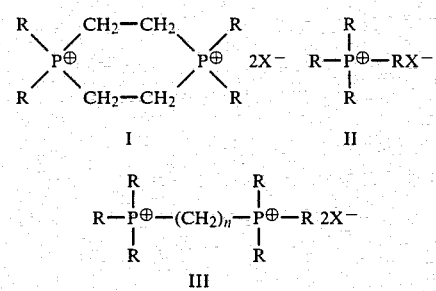

in which each R is selected independently from a substituted or unsubstituted hydrocarbyl group, n is an integer from 1 to 20, and X is a compatible anion. Preferred anions include halides, preferably bromide, chloride or iodide; carboxylates such as formate, acetate, oxalate or trifluoroacetate; conjugate bases of weak iinorganic acids, including bicarbonate, tetrafluoroborate or biphosphate; and conjugate bases of a phenol, including phenate or an anion derived from bisphenol-A.

The R groups can be aliphatic or aromatic. It has been found that the catalysts of formula III in which n is 1 are highly stable even in the presence of moisture. Contacting with water is the most common method of deactivating many hydrocarbyl phosphonium catalysts, but this is not an effective deactivation method for the water-stable methylene bis-type phosphonium salt catalysts. Thus, the hydrocarbyl phosphonium salt catalysts for which the invention deactivation method is particularly suitable can be represented by the formula IV, in which R

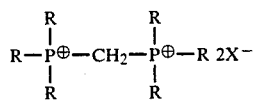

is hydrocarbyl or inertly substituted hydrocarbyl, preferably aromatic, and X is an anion as described above. The preferred water-resistant catalyst is methylene bis(triphenylphosphonium)dibromide (MBTPPB).

The above-described phosphonium salts are useful as catalysts of reactions of compounds having a vicinal epoxy group with acidic compounds such as phenols, thiophenols, carboxylic acids and carboxylic acid anhydrides, for example. An example of such a reaction is an epoxy fusion process in which a low molecular weight epoxy resin is reacted with an acidic fusion compound such as a phenol, thiophenol, carboxylic acid or carboxylic acid anhydride, to produce a high molecular weight fusion product. The low molecular weight epoxy resin starting material will preferably be a liquid polyepoxide having an average of more than one vicinal epoxy group per molecule and a weight per epoxide less than about 500. Preferred liquid polyepoxides include liquid glycidyl polyethers of polyhydric phenols and polyhydric alcohols. Most preferred are the glycidyl polyethers of 2,2-bis-(4-hydroxyphenyl)propane having an average molecular weight between about 340 and about 900 and an epoxide equivalent weight (ASTM D-1652) of between about 170 and about 500. Such liquid epoxy resins are available commercially as Epon® 828, a liquid epoxy resin having a molecular weight of about 376 and a weight per epoxide of about 185–192.

The low molecular weight epoxide is reacted with an acidic hydroxyl group containing compound such as a phenol, thiophenol, carboxylic acid or carboxylic acid anhydride. The phenols useful in the fusion reaction are those compounds having at least one hydroxyl group attached to an aromatic nucleus. The phenols can be monohydric or polyhydric and can be substituted or unsubstituted. Examples of suitable phenols include phenol, resorcinol, o-cresol, m-cresol, p-cresol, chlorophenol, nitrophenol, hydroquinone, 2,2-bis(4-hydroxyphenyl)propane,2,2-bis(4-hydroxyphenyl)pentane, and the like, and polymeric polyhydric phenol obtained by condensing monohydric or polyhydric phenols with formaldehyde.

Preferred phenols are polyhydric phenols containing from 2 to 6 hydroxyl groups and up to about 30 carbon atoms, including those represented by the formula V, wherein X is a polyvalent radical and each R' is independently selected from hydrogen, halogen and hydrocarbyl. The preferred radicals represented by X are oxygen, sulfur, divalent hydrocarbon radicals containing up to about 10 carbon atoms, and oxygen-, silicon-, sulfur- and nitrogen-containing hydrocarbon radicals. The preferred compound according to formula V is 2,2-bis(4-hydroxyphenyl)propane (bisphenol-A), in which each R' is H and X is propyl.

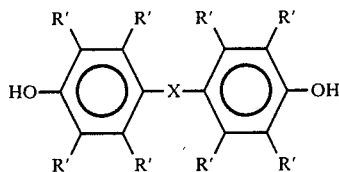

The amount of the phosphonium salt catalyst used in a fusion reaction can vary over a wide range, but the catalyst will generally be present in the fusion reaction mixture in an amount of from about 0.001 to about 8 weight percent, preferably from about 0.01 to about 2 weight percent, based on the weight of the reactants.

The fusion reaction may be carried out in the presence or absence of solvents or diluents. Generally, the reactants will be liquid and the reaction can be carried out without the addition of solvents or diluents. It it is considered desirable to carry out the reaction in a diluent, an inert hydrocarbon such as xylene, toluene or cyclohexane will generally be chosen.

The fusion reaction is generally carried out by combining the polyepoxide and fusion compound reactants at a starting temperature of about 100°–120° C. and allowing the reaction to exotherm to a temperature of about 160°–200° C., for a time of about 1–2 hours. The relative amounts of the reactants depends upon the characteristics, particularly molecular weight, of the product desired. For the preferred high molecular weight phenolic hydroxy ether resin products having an epoxide equivalent weight of between about 500 and about 7000, about 0.4 to 1 moles of bisphenol-A will be reacted with each mole of a liquid diglycidyl ether of bisphenol-A.

The fusion reaction can be carried out in the presence or absence of water, depending upon the sensitivity to water of the particular phosphonium salt catalyst employed and the fusion product desired. Satisfactory product is obtained when 0.01 weight percent or more water is present in the reaction mixture, particularly when the methylene bis-type fusion catalyst is employed.

When the fusion reaction has proceeded to an epoxy resin having the desired WPE, generally about 500 or greater, deactivation of the catalyst is conveniently carried out by adding, with stirring, the desired amount of the sulfonic acid deactivating agent to the fusion reaction mixture. The temperature at which deactivation is carried out is not critical, and will generally occur at the temperature of the fusion reaction mixture at the desired point of termination of the fusion reaction, which will generally be about 180° C. Reduction of the activity of the catalyst is essentially immediate upon contact by the sulfonic acid. Following deactivation of the catalyst, the advanced epoxy resin is recovered and processed by conventional methods.

EXAMPLE 1

This example shows the effectiveness of two different sulfonic acids in deactivating a highly stable phosphonium salt catalyst in an epoxy fusion reaction.

225 g of EPON 828, a polyglycidyl ether of bisphenol-A having a WPE of 185–192, was advanced by reaction with 75 g bisphenol-A in the presence of 0.05 weight percent, based on the initial epoxy plus BPA charge, of methylene bis(triphenyl phosphonium bromide) catalyst at 182C for about 2 hours, to yield an epoxy resin having a WPE of about 600. When an additional charge of 30 g bisphenol-A was added, the reaction proceeded to an epoxy product having a WPE of 2200, showing the continued high activity of the phosphonium halide catalyst. In one deactivation trial, 1 mole of p-toluenesulfonic acid per equivalent (0.5 mole) of catalyst was added to the reaction mixture containing 600 WPE resin. The WPE of the fusion resin stayed the same for 3 hours. The WPE did not increase appreciably even after additional BPA was added. The addition of 2 moles of p-toluenesulfonic acid or methane sulfonic acid per mole of the catalyst to the reaction mixture containing 600 WPE resin essentially terminated the fusion reaction. The results of the runs are summarized below in Table 1.

TABLE 1

Deactivation of MBTPPBr Catalyst

| TIME/HR | NO DEACTIVATOR | | | PTSA[1] | | | PTSA[2] | | | MSA[3] | | |
|---|---|---|---|---|---|---|---|---|---|---|---|---|
| | WPE | % TPPO | % PHOS. SALT | WPE | % TPPO | % PHOS. SALT | WPE | % TPPO | % PHOS. SALT | WPE | % TPPO | % PHOS. SALT |
| 1 | 583 | | | 589 | ~19 | ~81 | 575 | | | 589 | | |
| 1.5 | | | | | | | 578 | 21 | 79 | 591 | 21 | 79 |
| 2 | | | | | | | 579 | | | 600 | | |
| 3 | 607 | | | 590 | 27 | 73 | | | | 765 | 39 | 35 |
| 3.5 | | | | | | | 853 | 66 | 20 | | | |
| 4 | | | | 587 | | | | | | | | |
| 4.5 | | | | 689 | 54 | 36 | | | | | | |
| 5 | 721 | | | 711 | | | | | | | | |
| 5.5 | 1795 | | | | | | | | | | | |
| 6 | 2560 | | | 747 | ~69 | ~19 | | | | | | |
| 6.3 | 2224 | 41 | 59 | | | | | | | | | |
| | BPA added after 5 hours | | | PTSA added after 1 hour | | | Acid added after 1 hour | | | | | |
| | | | | BPA added after 4 hours | | | BPA added after 2 hours | | | | | |

[1] p-Toluenesulfonic acid deactivation (16.8 weight percent aqueous solution), 2 moles per mole methylene bis(triphenyl phosphonium bromide) catalyst.
[2] p-Toluenesulfonic acid deactivator, 1 mole per mole MBTPPBr catalyst.
[3] Methane sulfonic acid deactivator, 1 mole per mole MBTPPBr catalyst.

I claim:

1. A process for deactivating a hydrocarbyl phosphonium salt catalyst comprising contacting the catalyst with a sulfonic acid.

2. The process of claim 1 in which the sulfonic acid is a substituted or unsubstituted aromatic sulfonic acid.

3. The process of claim 1 in which the sulfonic acid is a substituted or unsubstituted aromatic and aliphatic sulfonic acid.

4. The process of claim 1 in which the sulfonic acid is toluenesulfonic acid.

5. The process of claim 1 in which the sulfonic acid is methane sulfonic acid.

6. The process of claim 1 in which the hydrocarbyl phosphonium salt catalyst is a methylene bis(triaryl phosphonium salt).

7. The process of claim 6 in which the hydrocarbyl phosphonium salt catalyst is a methylene bis(triphenyl phosphonium halide).

8. The process of claim 1 in which the sulfonic acid is an aqueous solution of from about 2 to about 30 weight percent sulfonic acid, based on the weight of water in the aqueous solution.

9. The process of claim 8 in which the sulfonic acid is employed in an amount of from about 0.05 to about 2.0 equivalents per equivalent of the hydrocarbyl phosphonium salt catalyst.

10. A process for preparing an advanced epoxy resin, the process comprising:
contacting in a reaction mixture a polyepoxide having an average of more than one vincinal epoxide group per molecule and a weight per epoxide less than about 500 with a fusion compound selected from the group consisting of phenols, thiophenols, carboxylic acids and carboxylic acid anhydrides in the presence of a catalytic amount of a hydrocarbyl phosphonium salt catalyst, at a temperature in the range of about 100° C. to about 200° C., for a time sufficient to produce an epoxy resin having a weight per epoxide of at least about 500; and thereafter, adding to the reaction mixture an amount of a sulfonic acid effective to reduce the activity of the hydrocarbyl phosphonium salt catalyst.

11. The process of claim 10 in which the sulfonic acid is added to the reaction mixture in an amount of about 0.05 to about 2.0 moles per mole of the hydrocarbyl phosphonium salt catalyst.

12. The process of claim 11 in which the sulfonic acid is selected from the group consisting of toluene sulfonic acid, methane sulfonic acid, dodecylbenzene sulfonic acid, trifluoromethane sulfonic acid, and benzene sulfonic acid.

13. The process of claim 11 in which the sulfonic acid is added as an aqueous solution.

14. The process of claim 11 in which the sulfonic acid is selected from the group consisting of aromatic sulfonic acids.

15. The process of claim 14 in which the aromatic sulfonic acid is toluenesulfonic acid.

16. The process of claim 11 in which the hydrocarbyl phosphonium salt catalyst is a methylene bistriphenyl-phosphonium salt.

17. The process of claim 16 in which the methylene bistriphenyl phosphonium salt is a methylene bis(triphenylphosphonium halide).

* * * * *